(12) United States Patent
Prenzel

(10) Patent No.: US 9,951,162 B2
(45) Date of Patent: Apr. 24, 2018

(54) UV-CROSSLINKABLE POLYMER COMPOSITION

(71) Applicant: TESA SE, Norderstedt (DE)

(72) Inventor: Alexander Prenzel, Hamburg (DE)

(73) Assignee: tesa SE, Norderstedt (DE)

( * ) Notice: Subject to any disclaimer, the term of this patent is extended or adjusted under 35 U.S.C. 154(b) by 0 days.

(21) Appl. No.: 15/115,991

(22) PCT Filed: Feb. 18, 2015

(86) PCT No.: PCT/EP2015/053362
§ 371 (c)(1),
(2) Date: Aug. 2, 2016

(87) PCT Pub. No.: WO2015/124593
PCT Pub. Date: Aug. 27, 2015

(65) Prior Publication Data
US 2017/0166671 A1   Jun. 15, 2017

(30) Foreign Application Priority Data
Feb. 18, 2014 (DE) .................. 10 2014 202 947

(51) Int. Cl.
| | | |
|---|---|---|
| C08F 2/46 | (2006.01) | |
| C08F 2/50 | (2006.01) | |
| C08G 61/04 | (2006.01) | |
| C08F 220/18 | (2006.01) | |
| C08J 3/28 | (2006.01) | |
| C08J 3/24 | (2006.01) | |
| C09J 133/08 | (2006.01) | |
| C09J 4/06 | (2006.01) | |

(52) U.S. Cl.
CPC .............. *C08F 220/18* (2013.01); *C08J 3/24* (2013.01); *C08J 3/28* (2013.01); *C09J 4/06* (2013.01); *C09J 133/08* (2013.01); *C08F 2220/1825* (2013.01); *C08F 2220/1858* (2013.01); *C08J 2433/08* (2013.01)

(58) Field of Classification Search
CPC ............ C08F 220/18; C08F 2220/1858; C08F 2220/1825; C08J 3/24; C08J 2433/08; C08J 3/28; C09J 4/06; C09J 133/08
USPC .......................... 522/154, 153, 150, 1; 520/1
See application file for complete search history.

(56) References Cited

U.S. PATENT DOCUMENTS

| | | | | |
|---|---|---|---|---|
| 5,391,406 A | * | 2/1995 | Ramharack | C08F 8/00 427/208.2 |
| 5,416,127 A | | 5/1995 | Chandran | |
| 5,489,451 A | | 2/1996 | Omeis et al. | |
| 5,516,509 A | * | 5/1996 | Marr-Leisy | A61K 8/35 424/61 |
| 2008/0299388 A1 | * | 12/2008 | Murakami | C08F 220/18 428/355 R |
| 2014/0323648 A1 | | 10/2014 | Schmidt et al. | |

FOREIGN PATENT DOCUMENTS

| | | | | |
|---|---|---|---|---|
| DE | 41 39 563 A1 | | 6/1993 | |
| DE | 10 2012 216 170 A1 | | 3/2014 | |
| DE | 102012216170 | * | 3/2014 | ............... C09D 4/00 |
| WO | 2013/104486 A1 | | 7/2013 | |

OTHER PUBLICATIONS

Frick et al, DE 102012216170 NPL, Mar. 13, 2014 (Year: 2014).*
Ozcan Altintas et al., "A Mild and Efficient Approach to Functional Single-Chain Polymeric Nanoparticles via Photoinduced Diels-Alder Ligation"; Macromolecules, vol. 46, No. 20, pp. 8092-8101, Oct. 22, 2013.
Till Gruendling et al., "Rapid UV Light-Triggered Macromolecular Click Conjugations via the Use of o-Quinodimethanesa"; Macromol. Rapid Communication, vol. 32, pp. 807-812, 2011.
Matthias Winkler et al., "Highly Orthogonal Functionalization of ADMET Polymers via Photo-Induced Diels-Alder Reactions"; Macromolecules, vol. 45, No. 12, pp. 5012-5019, Jun. 26, 2012.
International Search Report dated Apr. 22, 2015, dated Apr. 29, 2015.
English Translation of International Search Report dated Apr. 22, 2015, dated Apr. 29, 2015.
German Search Report dated Jan. 19, 2015.

* cited by examiner

*Primary Examiner* — Jessica Whiteley
(74) *Attorney, Agent, or Firm* — Norris McLaughlin & Marcuc P.A.

(57) ABSTRACT

Monomer composition comprising (i) acrylic monomers selected from the group consisting of (meth)acrylic acid and (meth)acrylic esters; (ii) orthoalkyl phenyl ketone- and/or orthoalkyl phenyl aldehyde-functionalized (meth)acrylate monomers; and (iii) optionally, further olefinically unsaturated monomers having functional groups; process for preparing a first polymer composition comprising the free-radical polymerization of the monomer composition, and polymer composition obtainable by this process; composition comprising the polymer composition and a dienophile which can react with hydroxy-ortho-quinodimethane functional groups in a Diels-Alder or hetero-Diels-Alder reaction and conversion of this composition to a crosslinked polymer composition.

14 Claims, No Drawings

UV-CROSSLINKABLE POLYMER COMPOSITION

This is a 371 of PCT/EP2015/053362 filed 18 Feb. 2015, which claims foreign priority benefit under 35 U.S.C. 119 of German Patent Application 10 2014 202 947.3 filed Feb. 18, 2014, the entire contents of which are incorporated herein by reference.

The present invention relates to a monomer composition comprising (i) acrylic monomers selected from (meth) acrylic acid and (meth)acrylic acid esters; (ii) (meth)acrylate monomers comprising an ortho-alkyl-substituted phenyl ketone and/or an ortho-alkyl-substituted benzaldehyde (referred to as "ortho-alkylphenyl ketone- and/or ortho-alkylphenylaldehyde-functionalized (meth)acrylate monomers" hereinbelow); and (iii) optionally further olefinically unsaturated monomers having functional groups. The invention relates further to a process for the preparation of a first polymer composition, which process comprises radically polymerizing the monomer composition described herein, as well as to a polymer composition obtainable by that process. Also described are compositions comprising the mentioned polymer composition and a dienophile that is able to react with hydroxyl-ortho-quinodimethane-functional groups in a Diels-Alder or hetero-Diels-Alder reaction. Finally, the present invention relates also to the conversion of that composition into a crosslinked polymer composition.

BACKGROUND OF THE INVENTION

UV-crosslinkable polyacrylates are known from the prior art and offer advantages over thermally crosslinkable systems. For example, UV-crosslinkable acrylate polymers can be applied extensively to a carrier and crosslinked in a controlled manner by controlling the UV radiation. Such dynamically controllable polymer systems represent a substantial advantage in a modern production structure if a complex product portfolio is to be produced starting from a small number of basic building blocks.

In conventional processes, Norrish type I and type II UV activators can be added for the UV crosslinking of polyacrylates. However, in the case of type I activators, competition reactions frequently occur when saturated polyacrylates are to be reacted. Norrish type II activators achieve crosslinking of unfunctionalized polyacrylates, but the degree of crosslinking is frequently low.

Other approaches of the prior art start from acrylate polymers containing vinyl double bonds for crosslinking. For the crosslinking of such polymers, the prior art proposes the use of electron beams. However, the use of electron beams is expensive and is sometimes accompanied by damage to the carriers onto which the polymer to be crosslinked is coated. Moreover, gel formation can occur on account of the vinyl double bonds even during the polymerization of the monomers to the acrylate polymers. Against this background, U.S. Pat. No. 5,391,406 and U.S. Pat. No. 5,416,127 describe a method in which vinyl groups are introduced subsequently by means of a polymer-analogous reaction. Such functionalized polymers can be coated from the melt and, after addition of a photoinitiator, can be crosslinked by means of UV light. However, in this process too, gelling during processing occurs in the case of high temperatures and under the influence of high shear forces. Moreover, polymer-analogous reactions are comparatively expensive.

Further problems arise when resins are added to the acrylate polymers in order to establish specific properties, such as particular tackiness, since such resins absorb UV light, so that crosslinking by means of UV light is limited by the layer thickness. Moreover, a large number of known photoinitiators lose their reactivity as a crosslinking starter when the initiator is used in a hot-melt process. Still other initiators sublime under thermal loading and in vacuo, for which reason such initiators likewise no longer ensure adequate crosslinking after a low-pressure extrusion step.

Some of the disadvantages mentioned above can be solved by using a polyfunctional α-cleaver. However, low molecular weight fragments also form when such an α-cleaver is used, which fragments can lead to undesirable contamination of the acrylate polymer. Moreover, the excited state of a large number of photoinitiators which permit a direct crosslinking reaction is extremely short-lived, so that the crosslinking step is not economical for energy reasons.

Accordingly, the object underlying the present invention is to provide an improved polyacrylate composition which is easy to obtain, can be processed in a hot-melt process, does not tend to gelling either during the hot-melt process or during coating, and can be crosslinked economically from the point of view of energy.

SUMMARY OF THE INVENTION

The present invention addresses that object and the problems of the prior art by providing a monomer composition comprising a mixture of
(i) from 69.9 to 99.9% by weight of at least one first monomer having the following structure

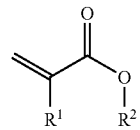

wherein $R^1$ represents hydrogen or methyl and $R^2$ is hydrogen or an alkyl radical having from 1 to 20 carbon atoms;
(ii) from 0.1 to 10% by weight of at least one second monomer which is a (meth)acrylate monomer and comprises an ortho-alkylphenyl ketone-functional group and/or an ortho-alkylphenylaldehyde-functional group which is isomerizable to a hydroxy-ortho-quinodimethane-functional group by irradiation by means of UV light; and
(iii) optionally up to 30% by weight of at least one further, olefinically unsaturated monomer having functional groups,
wherein the data in % by weight are in each case based on 100% by weight of monomers (i), (ii) and (iii) in the composition.

The present invention relates further to a process for the preparation of a polymer composition, which process comprises (a) providing the monomer composition described herein; and (b) radically polymerizing the monomer composition. The polymer composition which can be prepared by means of radical polymerization of the monomer composition is also referred to as the "first polymer composition" hereinbelow.

In a further aspect, the present invention accordingly relates to first polymer compositions which are obtainable by said process, and to compositions comprising from 50 to 99.9% by weight of the first polymer composition and from 0.1 to 15% by weight, preferably from 0.2 to 12% by weight, particularly preferably from 0.3 to 10% by weight, of a dienophile that is able to react with hydroxy-ortho-quinodimethane-functional groups in a Diels-Alder or hetero-Diels-Alder reaction. This composition comprising the "first polymer composition" and a dienophile is also referred to as the "reactive composition" hereinbelow.

The present invention relates further to a process for the preparation of a crosslinked polymer composition, which process comprises irradiating the reactive composition with UV light; and to the crosslinked polymer composition obtainable by the process according to claim 10.

The monomer compositions according to the invention have been found to be particularly suitable for the preparation of polyacrylate compositions which are easy to obtain, can be processed in a hot-melt process, do not result in particular gelling either during the hot-melt process or during coating, and the crosslinking of which is economical from the point of view of energy. This means that the first polymer composition described herein can be crosslinked in the presence of a dienophile with low UV intensity. Crosslinking is thereby possible without unnecessary cleavage products. The crosslinked polymer compositions of the present invention are distinguished by good pressure-sensitive adhesive properties. The present invention accordingly relates also to the use of the crosslinked polymer compositions as a pressure-sensitive adhesive, and to the use of the monomer composition in the production of such a pressure-sensitive adhesive.

DETAILED DESCRIPTION

The above-described object is achieved according to the invention by a process for the preparation of a polymer composition, which process comprises providing a monomer composition and radically polymerizing the monomer composition. According to the invention, the monomer composition comprises a mixture of (i) from 80 to 99.9% by weight, particularly preferably from 90 to 99.5% by weight, of at least one first monomer having the following structure

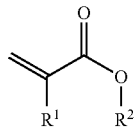

wherein $R^1$ represents hydrogen or methyl and $R^2$ is hydrogen or an alkyl radical having from 1 to 20 carbon atoms;

(ii) from 0.1 to 10% by weight, preferably from 0.5 to 5% by weight, of at least one second monomer which is a (meth)acrylate monomer and comprises an ortho-alkylphenyl ketone-functional group and/or an ortho-alkylphenylaldehyde-functional group which is isomerizable to a hydroxy-ortho-quinodimethane-functional group by irradiation by means of UV light; and (iii) optionally up to 10% by weight of at least one further, olefinically unsaturated monomer having functional groups, wherein the data in % by weight are in each case based on 100% by weight of monomers (i), (ii) and (iii) in the composition.

The ortho-alkylphenyl ketone-functional group and/or the ortho-alkylphenylaldehyde-functional group of the at least one second monomer preferably has the following structure:

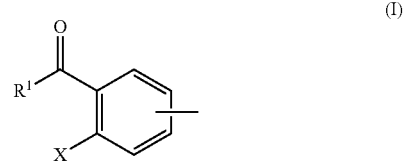

wherein R1 is hydrogen or phenyl and X represents a C—H-acidic substituent, preferably methyl.

The second monomer particularly preferably has the following structure (II):

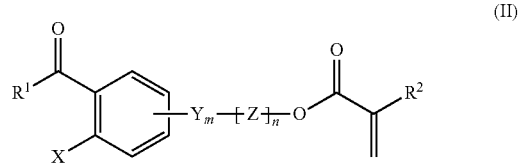

wherein R1 is hydrogen or phenyl; X represents a C—H-acidic substituent, preferably methyl; R2 is hydrogen or methyl; Y is a C, O, S or NH, preferably O; Z is an ethylene glycol or propylene glycol group or represents an aromatic or aliphatic C1-C18-unit; m is 0 or 1; and n is a number from 0 to 10, preferably from 1 to 10.

In a particularly preferred embodiment of the invention, the second monomer has the following structure (IIa), preferably one of the following structures (III) and (IV):

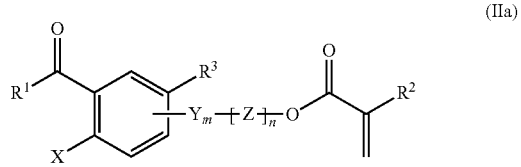

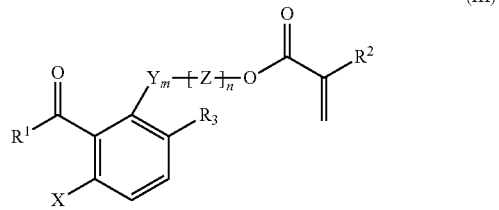

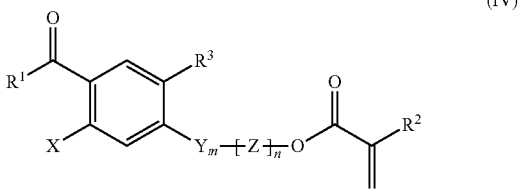

wherein R1 is hydrogen or phenyl; X represents a C—H-acidic substituent, preferably methyl; R2 is hydrogen or methyl; Y is a C, O, S or NH, preferably O; Z is an ethylene glycol or propylene glycol group or represents an aromatic or aliphatic C1-C18-unit; m is 0 or 1; n is a number from 0 to 10, preferably from 1 to 10; and R3 is hydrogen or alkyl, preferably hydrogen or methyl. The aromatic or aliphatic group Z in structures (II), (IIa), (IIb) and (IV) has from 1 to 18, preferably from 2 to 10, carbon atoms and can be substituted or unsubstituted. The unit Z in structures (II), (IIa), (III) and (IV) can further contain heteroatoms, preferably oxygen.

As used herein, the expression "(meth)acrylate" describes esters of methacrylic acid and acrylic acid. Correspondingly, the expression "(meth)acrylic acid" denotes methacrylic acid and acrylic acid. The expressions "ortho-alkylphenyl ketone" and "ortho-alkylphenylaldehyde" are understood in the present invention as meaning phenyl ketone and benzaldehyde groups which are alkyl-substituted on the phenyl ring in the ortho-position to the ketone or aldehyde unit, respectively, and which are isomerizable to a hydroxy-ortho-quinodimethane-functional group by means of UV light. They are preferably functional groups which have on their phenyl unit in the ortho-position to the ketone or aldehyde unit a C—H-acidic alkyl group which facilitates the isomerization of the ortho-alkylphenyl ketone or ortho-alkylphenylaldehyde group of the second monomer to a hydroxy-ortho-quinodimethane-functional group. This means that, by irradiating the monomer units of the second monomer, a hydroxy-ortho-quinodimethane unit forms, so that those monomer units have a functional group that is able to react as the enol (also "photoenol" hereinbelow) with a dienophile in a Diels-Alder or hetero-Diels-Alder reaction. Irradiation by means of UV light is preferably carried out for that purpose in a wavelength range of from 200 to 400 nm, preferably using a high-pressure or medium-pressure mercury lamp at a power of from 80 to 200 W/cm.

In a preferred embodiment of the invention, the monomer composition comprises a mixture of the following monomers (i) and (ii) as well as optionally at least one further, olefinically unsaturated monomer (iii). Preferred first monomers of group (i) are selected from the group consisting of acrylic acid, methacrylic acid, methyl acrylate, methyl methacrylate, ethyl acrylate, ethyl methacrylate, propyl acrylate, propyl methacrylate, n-butyl acrylate, n-butyl methacrylate, n-pentyl acrylate, n-hexyl acrylate, n-hexyl methacrylate, n-heptyl acrylate, n-octyl acrylate, n-nonyl acrylate, lauryl acrylate, stearyl acrylate, stearyl methacrylate, behenyl acrylate, their branched isomers (also called "structural isomers" herein) such as, for example, 2-ethylhexyl acrylate, as well as mixtures thereof. The monomer composition of the present invention preferably comprises from 80 to 99.9% by weight, particularly preferably from 90 to 99.5% by weight, of at least one first monomer of group (i). In a further embodiment of the invention, small amounts of cyclohexyl methacrylate, isobornyl acrylate and/or isobornyl methacrylate can be added to the monomer of group (i).

As the monomer of group (ii) there are preferred monomers which are selected from the group consisting of (meth)acrylic acid esters comprising a 2-formyl-3-methylphenoxy group or a 4-benzoyl-2,5-dimethylphenoxy group. Particularly preferred examples are 2-(2'-formyl-3'-methylphenoxy)ethyl acrylate, 2-(2'-formyl-3'-methylphenoxy)ethyl methacrylate, 2-(4'-benzoyl-2',5'-dimethylphenoxy)ethyl acrylate and 2-(4'-benzoyl-2',5'-dimethylphenoxy)ethyl methacrylate.

The monomer of group (iii) is preferably selected from the group consisting of maleic anhydride, itaconic anhydride, glycidyl methacrylate, hydroxyethyl acrylate, 4-hydroxybutyl acrylate, benzyl acrylate, benzyl methacrylate, phenyl acrylate, phenyl methacrylate, tert-butylphenyl acrylate, tert-butylphenyl methacrylate, phenoxyethyl acrylate, phenoxyethyl methacrylate, 2-butoxyethyl methacrylate, 2-butoxyethyl acrylate, dimethylaminoethyl methacrylate, dimethylaminoethyl acrylate, diethylaminoethyl methacrylate, diethylaminoethyl acrylate and tetrahydrofurfuryl acrylate, and further aromatic vinyl compounds. The further aromatic vinyl compounds preferably have from 4 to 18 carbon atoms in their aromatic unit and can contain heteroatoms. Particularly preferred examples thereof are styrene, 4-vinylpyridine, N-vinylpyrrolidone, N-vinylphthalimide, methylstyrene and 3,4-dimethoxystyrene.

The process according to the invention for the preparation of the first polymer composition comprises
(a) providing the monomer composition described herein; and
(b) radically polymerizing the composition.

According to the invention, the radical polymerization can be carried out as a free or controlled radical polymerization in conventional polymerization reactors. Such reactors generally have a stirring unit, a plurality of feeding vessels, reflux condensers, heating and cooling devices, and they are suitable for working under an inert gas atmosphere (preferably nitrogen) as well as under excess or low pressure. The radical polymerization can be carried out in the presence of one or more organic solvents and/or in the presence of water or without a solvent, that is to say in the absence of solvents. According to the invention, the amount of solvent used is kept as small as possible. The polymerization time is preferably between 6 and 48 hours, particularly preferably between 10 and 24 hours.

In a preferred embodiment of the invention, the weight-average molecular weight Mw, determined by means of gel permeation chromatography (measuring method A2), of the polymers in the first polymer composition is between 300,000 and 2,000,000 g/mol, preferably between 600,000 and 1,200,000 g/mol.

There are used as solvents in a solution polymerization preferably esters of saturated carboxylic acids (for example ethyl acetate), aliphatic hydrocarbons (for example n-hexane or n-heptane), ketones (such as acetone or methyl ethyl ketone), special boiling point spirits or mixtures of these solvents. Particular preference is given to a solvent mixture of acetone and isopropanol, wherein the isopropanol content is between 1 and 10% by weight of the solvent mixture.

Polymerization initiators are preferably used in the process according to the invention. Suitable initiators that are used are conventional radical-forming compounds, for example peroxides or azo compounds. Initiator mixtures can also be used. In order to establish a low molecular weight and to reduce the polydispersity, regulator additives, preferably thiols, alcohols and/or ethers, can additionally be used.

The monomers of groups (i), (ii) and (iii) that are used in this radical polymerization are preferably so chosen that the first polymer composition could also be used as a thermally crosslinkable acrylate composition. The nature of the individual comonomers, that is to say of the monomers of groups (i), (ii) and (iii), is preferably so chosen that the glass transition temperature $T_{G,A}$ (determined by the DSC method) of the polymers in the first polymer composition is below the application temperature, preferably below 15° C.

The polymers of the first polymer composition, that is to say of the polymer composition that is obtainable by the described process, comprise, on account of the monomer units (ii), ortho-alkylphenyl ketone or ortho-alkylphenylaldehyde groups which are isomerizable to ortho-quinodimethane units (photoenols) by means of UV irradiation, as described herein. These ortho-quinodimethane units are highly reactive dienes which are able to enter into a Diels-Alder or hetero-Diels-Alder reaction with dienophiles.

Surprisingly, it has been found that the radical polymerization of the monomer composition described herein does not impair the reactivity of those functional groups, and that the mentioned groups are not decomposed even after prolonged hot-melt steps. This means that the polymers of the first polymer composition of the present invention can be reacted with conventional dienophiles in a Diels-Alder or hetero-Diels-Alder reaction.

Typical dienophiles come into consideration as dienophiles for the Diels-Alder or hetero-Diels-Alder reaction. Alkenes, alkynes, nitriles, imines, azo compounds, carbonyl compounds and/or dithioesters are preferably suitable. Alkenes are particularly preferably used as dienophiles, particularly preferably maleimides or acrylic acid esters or dithioesters.

The first polymer composition is thus preferably provided in the form of a reactive composition comprising from 50 to 99.9% by weight, preferably from 50 to 99.8% by weight, particularly preferably from 50 to 99.7% by weight, of the first polymer composition and from 0.1 to 15% by weight, preferably from 0.2 to 12% by weight, particularly preferably from 0.3 to 10% by weight, of a dienophile and optionally up to 49.9% by weight of additives.

Preferred dienophiles are low molecular weight or polymeric crosslinkers having at least two dienophile functionalities. Alternatively, crosslinking can be effected by using a free dienophile unit, for example of an acrylic acid ester, in the polymer side chains of the polymers of the first polymer composition as the reactant for the ortho-methylphenyl ketone or the ortho-methylphenylaldehyde after conversion thereof into a photoenol in a Diels-Alder or hetero-Diels-Alder reaction.

Particularly preferred low molecular weight and polymeric crosslinkers having at least two dienophile functionalities are selected from the group of compounds V and VI:

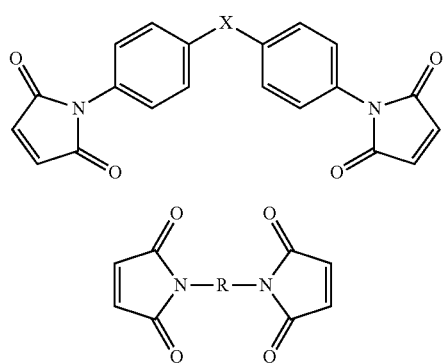

In the bismaleimide structures V and VI, X represents a bond, oxygen, C=O, SO$_2$, CH$_2$, ether or polyether radicals, ester or polyester radicals, or an aromatic group; and R describes primary, secondary or tertiary alkyl radicals, or ether or polyether radicals, or ester or polyester radicals. Particularly preferred examples of commercially available bismaleimides are 1,4-di(maleido)butane, N,N'-(4-methyl-1,3-phenylene)bismaleimide, N,N'-(1,3-phenylene)dimaleimide, N,N'-(1,4-phenylene)dimaleimide, 1,1'-(methylenedi-4,1-phenylene)bismaleimide and 1,1'-(3,3'-dimethyl-1,1'-biphenyl-4,4'-diyl)bismaleimide.

Suitable preferred acrylic acid esters for crosslinking of the first polymer composition are 1,6-hexanediol diacrylate (HDDA), trimethylpropane triacrylate, pentaerythritol triacrylate, pentaerythritol tetraacrylate and dipentaerythritol hexaacrylate, as well as oligomers and polymers based on ethylene and propylene glycol structures (for example from Polyscience Inc.), polyether structures (for example obtainable under the trade name Laromer® from BASF SE), polyester structures (for example obtainable under the trade name Laromer® from BASF SE), polyamide structures, polyurethane structures (for example obtainable under the trade name Desmolux® from Bayer) and polysiloxane structures (for example from Gelest).

Preferred dithioester-based dienophiles comprise at least two dithioester functionalities having the following general structure (VII)

wherein S in each case represents a sulfur atom, Z and R are each chosen independently of the other, and Z is a radical from one of groups i) to v), and R is a radical from one of groups i) to iii), with the proviso that the group R is substituted by a further Z—C(=S)—S— unit, or that the group Z is substituted by a further —C(=S)—S—R unit, wherein two groups Z or two groups R within the dienophile (VII) are selected independently of one another, and wherein:

i) includes C$_1$-C$_{18}$-alkyl, C$_2$-C$_{18}$-alkenyl, C$_2$-C$_{18}$-alkynyl, each linear or branched; aryl, phenyl, benzyl, aliphatic and aromatic heterocycles; and ii) includes —NH$_2$, —NHR$^1$, —NR$^1$R$^2$, —NH—C(O)—R$^1$, —NR$^1$—C(O)—R$^2$, —NH—C(S)—R$^1$, —NR$^1$—C(S)—R$^2$,

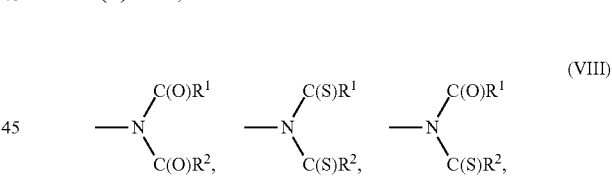

wherein R$^1$ and R$^2$ are radicals chosen independently of one another from group i); and iii) is —S—R$^3$ or —S—C(S)—R$^3$, wherein R$^3$ is a radical selected from one of groups i) or ii); and iv) represents —O—R$^3$ or —O—C(O)—R$^3$, wherein R$^3$ is a radical selected from one of groups i) or ii); and v) is —P(O)—(OR$^1$)$_2$, wherein R$^1$ is a radical selected from group i).

In an advantageous embodiment of the invention, tackifying resins can further be added to the reactive composition in an amount, in percent, of up to 49.9% by weight, based on the total composition. There can be used for that purpose, without exception, all the prior-known adhesive resins described in the literature. Examples which may be mentioned include pinene, indene and colophony resins, their disproportionated, hydrogenated, polymerized, esterified derivatives and salts, aliphatic and aromatic hydrocarbon resins, terpene resins and terpene phenolic resins as well as C5-, C9- and other hydrocarbon resins. Arbitrary combinations of these and further resins can be used in order to adjust the properties of the resulting composition as desired.

Pulverulent and granular fillers, dyes and pigments, in particular also abrasive and reinforcing additives, such as, for example, aerosils (fumed silicas), can optionally also be used.

Furthermore, the first polymer composition can optionally also be mixed with other polymers. Polymers based on natural rubber, synthetic rubber, ethyl vinyl acetate (EVA), silicone rubber, acrylic rubber and polyvinyl ether are suitable for that purpose.

Conventional plasticizers, in particular in concentrations of up to 5% by weight, can optionally also be added. There can be used as plasticizers, for example, low molecular weight polyacrylates, phthalates, water-soluble plasticizers, plasticizing resins, phosphates, polyphosphates, adipates and/or citrates.

It is also possible to add crosslinker substances which facilitate thermal crosslinking of the polymer compositions, if it is desired to increase the cohesion of the polyacrylate composition by an additional, thermal crosslinking. Suitable crosslinkers are, for example, metal chelates, multifunctional isocyanates, multifunctional amines, multifunctional epoxides, multifunctional aziridines, multifunctional oxazolines as well as multifunctional carbodiimides.

For further processing, the first polymer composition according to the invention is thus preferably mixed with the optional additives and applied or translaminated, preferably in the form of a hot melt, preferably in the form of a reactive composition, onto a carrier (for example of polypropylene, BOPP, polyethylene terephthalate, nonwoven, PVC, polyester or in the form of a polyolefin, polyacrylate or polyurethane foam) or onto a release paper (for example glassine, HDPE, LDPE).

Although the ortho-alkylphenyl ketone and ortho-alkylphenylaldehyde functional groups both within the first polymer composition and within the reactive composition are stable over long periods of up to one hour even under hot-melt conditions at temperatures of up to 180° C., it may be expedient in order to increase the life of compositions described herein to exclude light, in particular UV light, for storage purposes. It has further been shown that the life of the photoenols during irradiation with UV light can be increased further if substances such as pyridine or 2,6-dimethylphenol are added in order to increase the photon quantum yield.

The UV crosslinking preferably takes place directly on the described carrier or release paper.

The monomer composition described herein is outstandingly suitable for the simple provision of a first polymer composition, which remains crosslinkable even under intensified conditions such as elevated temperatures and the use of high shear forces, and which, even after crosslinking, leads to virtually no gelling or no gelling at all in a Diels-Alder or hetero-Diels-Alder reaction. The crosslinking of the first polymer composition described herein with a dienophile is also possible with a low outlay in terms of energy in the form of low-intensity UV radiation, whereby uniform crosslinking of different layer thicknesses is possible. The inventors assume that the duration of the excited state of the UV-activatable groups is responsible therefor. Since the UV-activatable groups are bonded to the polymer backbone of the polymers within the first polymer composition, migration of the functionalities required for crosslinking is prevented. Furthermore, the crosslinking also does not lead to homolytic or heterolytic bond cleavage in which molecule fragments would be freed, and the crosslinking proceeds selectively, so that the degree of crosslinking of the polymer composition can purposively be adjusted.

The invention will be explained in greater detail below by means of examples, without thereby limiting the invention.

EXPERIMENTAL SECTION

The following exemplary experiments are intended to explain the invention in greater detail, without the invention being unnecessarily limited by the choice of the mentioned examples.

Measuring Methods (General):

K Value (According to Fikentscher) (Measuring Method A1):

The K value is a measure of the average molecule size of highly polymeric substances. For the measurement, one percent strength (1 g/100 ml) solutions of polymer in toluene were prepared, and the kinematic viscosities thereof were determined by means of a Vogel-Ossag viscometer. After normalization to the viscosity of toluene, the relative viscosity is obtained, from which the K value can be calculated according to Fikentscher (*Polymer* 1967, 8, 381 ft).

Gel Permeation Chromatography GPC (Measuring Method A2):

Weight-average molecular weight $M_w$ and polydispersity PD data in this specification relate to determination by gel permeation chromatography. The determination is carried out on 100 μl of clear-filtered sample (sample concentration 4 g/l). Tetrahydrofuran with 0.1% by volume trifluoroacetic acid is used as eluant. The measurement is carried out at 25° C. A column of type PSS-SDV, 5μ, $10^3$ Å, ID 8.0 mm×50 mm is used as the pre-column. For separation, columns of type PSS-SDV, 5μ, $10^3$ Å and $10^5$ Å and $10^6$ Å each with ID 8.0 mm×300 mm are used (columns from Polymer Standards Service; detection by means of Shodex R171 differential refractometer). The throughput is 1.0 ml per minute. Calibration is against PMMA standards (polymethyl methacrylate calibration).

Determination of the Gel Content (Measuring Method A3):

The carefully dried solvent-free adhesive samples are shrink-wrapped in a nonwoven bag of polyethylene (Tyvek nonwoven). The gel value, that is to say the amount by weight of polymer that is not soluble in toluene, is determined from the difference in the sample weights before and after extraction by ethyl acetate. Additives, such as, for example, resins, which are not incorporated into the network even after UV irradiation must be subtracted from the total sample weight prior to extraction.

$^1$H-Nuclear Magnetic Resonance Spectroscopy $^1$H-NMR (Measuring Method A4)

$^1$H-NMR spectroscopy was carried out on a Bruker AM 400 MHz spectrometer. The samples were dissolved in CDCl$_3$. Tetramethylsilane was used as the internal standard.

Measuring Methods (Pressure-Sensitive Adhesives):

180° Adhesive Force Test (Measuring Method H1):

A 20 mm wide strip of a pressure-sensitive acrylate adhesive applied as a layer to polyester was applied to steel plates which had previously been washed twice with acetone and once with isopropanol. The pressure-sensitive adhesive strip was pressed onto the substrate twice for one minute with a contact pressure corresponding to a weight of 2 kg. To that end, a weight in roller form was guided over the pressure-sensitive adhesive strip twice. The adhesive tape was then immediately removed from the substrate at a speed of 300 mm/min and at an angle of 180°. All measurements were carried out at room temperature.

The measurement results are given in N/cm and are the mean of three measurements.

Holding Power (Pressure-Sensitive Adhesive on PET Film, Measuring Method H2):

A strip of the adhesive tape 13 mm wide and more than 20 mm (for example 30 mm) long was applied to a smooth steel surface which had been cleaned three times with acetone and once with isopropanol. The bonding area was 20 mm×13 mm (length×width), whereby the adhesive tape protruded from the edge of the test plate (for example by 10 mm according to the above-indicated length of 30 mm). The adhesive tape was then pressed onto the steel carrier four times for one minute with a contact pressure corresponding to a weight of 2 kg. To that end, a weight in roller form was guided over the pressure-sensitive adhesive strip four times. The sample was suspended perpendicularly so that the protruding end of the adhesive tape points downwards. At room temperature, a weight of 1 kg was attached to the protruding end of the adhesive tape. The measurement is carried out under a standard atmosphere (23° C.+/−1° C., 55%+/−5% humidity) and at 70° C. in a hot cabinet, whereby the sample was loaded with a weight of 0.5 kg for this measurement.

The measured holding times (times until the adhesive tape becomes detached completely from the substrate; measurement terminated at 10,000 min) are given in minutes and correspond to the mean of three measurements.

Commercially Available Chemicals Used

| Chemical compound | Trade name | Manufacturer | CAS No. |
|---|---|---|---|
| 2-Bromoethanol | — | Sigma-Aldrich | 540-51-2 |
| Acrylic acid chloride | — | Merck KGaA | 814-68-6 |
| Triethylamine | — | Sigma-Aldrich | 121-44-8 |
| 2,2'-Azobis(2-methylbutyronitrile) | Vazo ® 67 | DuPont | 13472-08-7 |
| Bis-(4-tert-butylcyclohexyl) peroxydicarbonate | Perkadox ® 16 | Akzo Nobel | 15520-11-3 |
| 1,1'-(Methylenedi-p-phenylene)bismaleimide | — | Sigma-Aldrich | 13676-54-5 |
| Bis(maleimido)hexane | BMH | Pierce Biotechnology | 4856-78-5 |
| Polyester acrylate | Laromer ® LR 8981 | BASF SE | — |
| Urethane acrylate | Desmolux ® XP 2740 | Bayer Material Science | — |
| UV-crosslinkable acrylate hot-melt pressure-sensitive adhesive (K value 48-52) | acResin ® A 260 UV | BASF SE | — |
| Terpene phenolic resin (softening point 110° C.; $M_w$ = 500-800 g/mol; D = 1.50) | Dertophene ® T110 | DRT resins | 25359-84-6 |
| Urea-aldehyde resin (melting range 80-95° C.) | Laropal ® A 81 | BASF SE | 28211-77-0 | all data specified at 20° C., measurement of the K value according to measuring method A1.

Preparation of Acrylate Monomers Having Ortho-Methylphenyl Ketone or -Aldehyde Functionality (Monomers of Group (ii))

Synthesis of 2-hydroxy-6-methylbenzaldehyde (1)

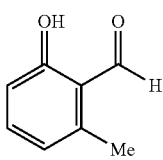

The synthesis of 2-hydroxy-6-methylbenzaldehyde was carried out according to the synthesis protocol in *Angew. Chem.* 2013, 125, 791-796.

Synthesis of 2-((2-hydroxyethyl)oxy)-6-methylbenzaldehyde (2)

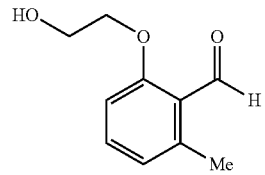 [SMILES: Cc1cccc(OCCO)c1C=O]

13.6 g (100 mmol) of 2-hydroxy-6-methylbenzaldehyde were added to a suspension of K2CO3 (5.9 g, 42.7 mmol) in 78 ml of anhydrous DMF, and the mixture was stirred for 30 minutes at room temperature (20° C.). A solution of 10.1 g of 2-bromoethanol (81.9 mmol) in 30 ml of anhydrous DMF was then added dropwise within a period of 30 minutes. After stirring for a further 72 hours, the reaction was quenched by addition of 750 ml of water. The mixture was extracted three times with diethyl ether, and the combined organic phases were then washed with 5% sodium hydroxide solution (2×750 ml) and water (2×1000 ml). The organic phase was dried over MgSO4, the solvent was removed in vacuo, and the residue was purified by column chromatography over silica gel (cyclohexane:ethyl acetate, 2:1). The product was obtained in the form of a yellowish oil in a yield of 54% (6.6 g, 36.9 mmol).

$^1$H-NMR (CDCl$_3$, 400 MHz, measuring method A4) δ (ppm)=10.67 (s, 1H, CHO), 7.34 (t, $^3J$=7.9 Hz, 1H, ArH), 6.80 (t, $^3J$=8.2 Hz, 2H, ArH), 4.03 (t, $^3J$=6.3 Hz, 2H, OCH$_2$), 3.64 (t, $^3J$=6.6 Hz, 2H, HOCH$_2$), 2.57 (s, 3H, CH$_3$).

Synthesis of 2-(2'-formyl-3'-methylphenoxy)ethyl acrylate

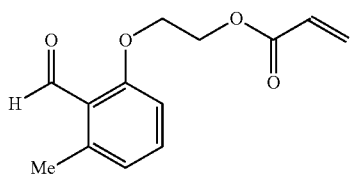 [SMILES: C=CC(=O)OCCOc1cccc(C)c1C=O]

10.0 g (73.5 mmol) of 2-((2-hydroxyethyl)oxy)-6-methylbenzaldehyde were dissolved in 400 ml of chloroform. 13.3 g (147.0 mmol) of acrylic acid chloride and, after stirring for a further five minutes, 18.6 g (183.8 mmol) of triethylamine were then added at room temperature (20° C.) to the solution. The reaction mixture was stirred for 16 hours at room temperature, and then the solvent was removed in vacuo. The residue was again taken up in ethyl acetate and filtered over silica gel in order to remove the ammonium salts. The residue was purified by column chromatography over silica gel (hexane:ethyl acetate, 2:1). The product was obtained in the form of a highly viscous, yellowish oil in a yield of 94% (16.2 g, 69.1 mmol). $^1$H-NMR (CDCl$_3$, 400 MHz, measuring method A4) δ (ppm)=10.32 (s, 1H, CHO), 7.38 (t, $^3$J=7.9 Hz, 1H, ArH), 6.76 (dd, J=25.3; 7.9 Hz, 2H, ArH), 6.65 (dd, J=17.3; 1.3 Hz, 1H, —CH=CH$_2$), 6.37 (dd, J=17.3; 10.4 Hz, 1H, —CH=CH$_2$), 6.05 (dd, J=10.4; 1.3 Hz, 1H, —CH=CH$_2$), 4.32-4.29 (m, 2H, —O—CH$_2$—CH$_2$—OCO), 3.75-3.71 (m, 2H, —O—CH$_2$—CH$_2$—OCO), 2.61 (s, 3H, CH$_3$).

Synthesis of 2-(4'-benzoyl-2',5'-dimethylphenoxy) ethyl acrylate

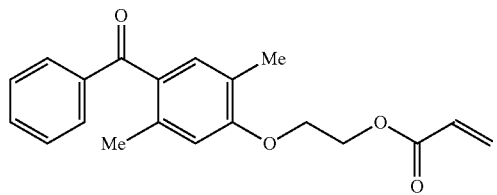 [SMILES: C=CC(=O)OCCOc1cc(C)c(C(=O)c2ccccc2)cc1C]

The synthesis of (2-(4'-benzoyl-2',5'-dimethylphenoxy) ethyl acrylate was carried out according to the synthesis protocol in *Macromolecules* 2012, 45, 5012-5019.

Preparation of Base Polymers P1 to P4 ("First Polymer Compositions")

The preparation of the base polymers is described hereinbelow.

Example Base Polymer P1

A 200-liter glass reactor conventional for radical polymerizations was filled with 2.4 kg of acrylic acid (AA, 3%), 38.0 kg of 2-ethylhexyl acrylate (EHA, 47.5%), 38.0 kg of butyl acrylate (BA, 47.5%), 1.6 kg of 2-(2'-formyl-3'-methylphenoxy)ethyl acrylate (2%) and 53.3 kg of acetone/benzin 60/95 (1:1). After passing nitrogen gas through for 45 minutes, with stirring, the reactor was heated to 58° C. and 0.8 kg of Vazo® 67 was added. The external heating bath was then heated to 75° C. and the reaction was carried out constantly at that external temperature. After a reaction time of 1 hour, a further 0.8 kg of Vazo® 67 was added. Over a period of a further 5 hours, dilution was carried out every hour, according to the viscosity increase, with 5.0 to 10.0 kg of benzin 60/95 in each case. In order to reduce the residual monomers, 1.5 kg of bis-(4-tert-butylcyclohexyl) peroxydicarbonate was added 6 and 7 hours after the start of the reaction, and in the meantime the mixture was diluted with 15 kg of benzin 60/95. The reaction was terminated after a reaction time of 24 hours and cooled to room temperature.

Base Polymers P2 to P4

Base polymers P2 to P4 were prepared analogously to example P1. The amounts, in percent, of the monomers used are given in table 1.

TABLE 1

Base polymers P2 to P4

| | AA | BA | EHA | 2-(2'-Formyl-3'-methylphenoxy)-ethyl acrylate | 2-(4'-Benzoyl-2',5'-dimethylphenoxy)ethyl acrylate |
|---|---|---|---|---|---|
| P2 | 3.0% | 46.0% | 46.0% | 5.0% | — |
| P3 | 5.0% | 60.0% | 30.0% | — | 5.0% |
| P4 | 5.0% | 56.7% | 23.3% | — | 10.0% |

The molar mass distributions, measured by means of GPC, of base polymers P1 to P4 are shown in table 2.

TABLE 2

GPC data of base polymers P1 to P4

| | $M_n$ [g/mol]$^{a)}$ | $M_w$ [g/mol]$^{a)}$ | PD [—]$^{a)}$ |
|---|---|---|---|
| P 1 | 64,800 | 870,000 | 13.4 |
| P 2 | 66,900 | 850,000 | 12.7 |
| P 3 | 68,500 | 620,000 | 9.1 |
| P 4 | 68,100 | 605,000 | 8.9 |

$^{a)}$measured according to measuring method A2.

Production of Pressure-Sensitive Adhesives PSA1 to PSA14 ("Crosslinked Polymer Compositions") and of Comparative Examples CPSA15 to CPSA19

The production of the pressure-sensitive adhesives is described hereinbelow. For UV irradiation, a UV system from Eltosch was used. The system is equipped with a medium-pressure Hg UV radiator having an intensity of 120 W/cm. The coated samples were each moved through the system at a speed of 20 m/min, whereby the radiation dose was increased by irradiating the samples in several passes.

Example PSA1

Base polymer P1 as obtained above was blended with 0.3 part by weight of Laromer® LR 8981, corresponding to a solids content of 0.3% by weight of the solution, and then concentrated in a single-screw extruder (Berstorff). The speed of the screw was 160 rpm, and a throughput of 55 kg/h was achieved. For concentration, a vacuum was applied at three different domes. The low pressures were 130 mbar, 75 mbar and 60 mbar, whereby the lowest vacuum was applied in the first dome. The outlet temperature of the concentrated hot melt was 130° C., so that the residual solids content was below 0.2% by weight. For coating, the strands were melted in a flat die (Pro's). After tempering at 120° C. for 1 hour, coating was carried out on a 23 μm thick PET film provided with a Saran primer. Two samples were produced with different application rates of 50 g/m² and 150 g/m². The adhesive tape samples were then irradiated by 1 to 2 passes through the UV system. In order to determine the efficiency of the crosslinking, test method A3 was carried out in each case. Test methods H1 and H2 were used to check the adhesive properties. The results are shown in table 4.

Examples PSA2 to PSA14

Examples PSA2 to PSA14 were produced analogously to example PSA1. The amounts, in percent, of the crosslinkers or further additives, such as, for example, adhesive resins, which were used are given in table 3. The dose used (indicated as the number of passes) and the adhesive properties are shown in table 4.

Comparative Examples CPSA15 to CPSA19

Examples CPSA15 to CPSA19 were produced analogously to example PSA1. For examples CPSA16 to CPSA19, the UV-crosslinkable polyacrylate hot-melt pressure-sensitive adhesive acResin® A 260 UV was used as the base composition. The amounts, in percent, of the crosslinkers or further additives, such as, for example, adhesive resins, which were used are given in table 3. The dose used (indicated as the number of passes) and the adhesive properties are shown in table 4.

TABLE 3

Examples PSA2 to PSA14 and comparative examples CPSA15 to CPSA19

| Ex. | Base polymer | Crosslinker[a] | Amount of crosslinker [by weight] | Additive | Amount of additive [by weight] |
|---|---|---|---|---|---|
| PSA2 | P1 | Laromer | 0.7 | — | — |
| PSA3 | P1 | Desmolux | 0.25 | — | — |
| PSA4 | P1 | Laromer | 0.5 | DT110 | 30 |
| PSA5 | P1 | Laromer | 0.25 | Laropal | 30 |
| PSA6 | P2 | Laromer | 0.4 | — | — |
| PSA7 | P2 | Desmolux | 0.4 | — | — |
| PSA8 | P3 | BMH | 0.2 | — | — |
| PSA9 | P3 | BMH | 0.5 | — | — |
| PSA10 | P3 | BMMDP | 0.2 | — | — |
| PSA11 | P3 | BMMDP | 0.4 | DT110 | 30 |
| PSA12 | P3 | BMMDP | 0.4 | Laropal | 30 |
| PSA13 | P4 | BMH | 0.15 | — | — |
| PSA14 | P4 | BMMDP | 0.15 | — | — |
| CPSA15 | P1 | — | — | — | — |
| CPSA16 | acResin | — | — | — | — |
| CPSA17 | acResin | Laromer | 0.4 | — | — |
| CPSA18 | acResin | — | — | DT110 | 30 |
| CPSA19 | acResin | — | — | Laropal | 30 |

[a]Laromer = Laromer LR 8981; Desmolux = Desmolux XP 2740; BMH = bis(maleido)hexane; BMMDP = 1,1'-(methylenedi-p-phenylene)bismaleimide; DT110 = terpene phenolic resin Dertophene T 110; Laropal = Laropal A 81; acResin = UV-crosslinkable pressure-sensitive polyacrylate adhesive acResin A 260 UV.

TABLE 4

Adhesive data of examples PSA1 to PSA14 and of comparative examples CPSA15 to CPSA19

| Ex. | Application rate [g/m²] | UV dose [number of passes] | Gel value [%][a] | AF steel [N/cm²][b] | HT RT [min][c] |
|---|---|---|---|---|---|
| PSA1a | 50 | 1 | 65 | 5.25 | 1280 |
| PSA1b | 150 | 2 | 52 | 6.03 | 800 |
| PSA2a | 50 | 1 | 84 | 4.80 | 5680 |
| PSA2b | 150 | 2 | 72 | 5.36 | 1900 |
| PSA3a | 50 | 1 | 66 | 5.36 | 1600 |
| PSA3b | 150 | 2 | 52 | 6.24 | 1003 |
| PSA4a | 50 | 1 | 58 | 7.56 | 2200 |
| PSA4b | 150 | 3 | 41 | 8.99 (C) | 860 (C) |
| PSA5a | 50 | 1 | 61 | 7.12 | 2180 |
| PSA5b | 150 | 2 | 53 | 8.57 | 920 |
| PSA6a | 50 | 1 | 79 | 3.80 | 3560 |
| PSA6b | 150 | 1 | 57 | 4.58 | 1140 |
| PSA7a | 50 | 1 | 81 | 3.99 | 4570 |
| PSA7b | 150 | 1 | 62 | 4.62 | 1200 |
| PSA8a | 50 | 1 | 67 | 5.12 | 1760 |
| PSA8b | 150 | 2 | 59 | 5.89 | 960 |
| PSA9a | 50 | 1 | 86 | 4.56 | 4800 |
| PSA9b | 150 | 2 | 69 | 5.44 | 1300 |
| PSA10a | 50 | 1 | 64 | 5.63 | 1700 |
| PSA10b | 150 | 2 | 54 | 6.23 | 1000 |
| PSA11a | 50 | 1 | 69 | 7.52 | 3450 |
| PSA11b | 150 | 3 | 53 | 8.12 | 1020 |
| PSA12a | 50 | 1 | 70 | 7.49 | 3720 |
| PSA12b | 150 | 2 | 53 | 8.22 | 1130 |
| PSA13a | 50 | 1 | 82 | 3.56 | >10,000 |
| PSA13b | 150 | 2 | 71 | 4.32 | 6230 |
| PSA14a | 50 | 1 | 83 | 3.99 | >10,000 |
| PSA14b | 150 | 2 | 69 | 4.52 | 5800 |
| CPSA15a | 50 | 4 | 6 | 6.23 (C) | <10 (C) |
| CPSA15b | 150 | 4 | 5 | 6.52 (C) | <10 (C) |
| CPSA16a | 50 | 1 | 52 | 4.23 | 960 |
| CPSA16b | 150 | 3 | 32 | 5.65 (C) | 120 (C) |
| CPSA17a | 50 | 1 | 51 | 4.42 | 860 (C) |
| CPSA17b | 150 | 3 | 31 | 4.98 (C) | 750 (C) |
| CPSA18a | 50 | 2 | 39 | 6.23 | 850 |
| CPSA18b | 150 | 3 | 22 | 6.45 (C) | 163 (C) |
| CPSA19a | 50 | 2 | 44 | 5.89 | 1100 |
| CPSA19b | 150 | 3 | 36 | 6.23 | 750 (C) |

[a]measuring method A3;
[b]measuring method H1, AF = adhesive force;
[c]measuring method H2, HT = holding time, RT = room temperature; if no details are given regarding the detachment mechanism, it is an adhesive failure, otherwise C = cohesive failure.

It can clearly be seen from the examples according to the invention that the photo-induced Diels-Alder reaction between polymer-bonded photoenol functionalities and a crosslinker comprising at least one functional group reacting as the dienophile, as compared with commercially available, having functional groups which are likewise polymer-bonded and react via a Norrish type II mechanism (CPSA16 and 17), is suitable in particular for the crosslinking of pressure-sensitive adhesives with higher application rates. It can further be seen that even the use of additives such as adhesive resins does not lead to a substantial deterioration in the crosslinking efficiency as compared with comparative examples CPSA18 and 19. It can be seen from comparative example CPSA15 that only the blend with dienophiles leads to UV crosslinking.

The invention claimed is:
1. A monomer composition comprising a mixture of
    (i) from 80 to 99.9% by weight of at least one first monomer having the following structure

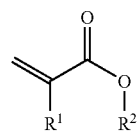

wherein R¹ represents hydrogen or methyl and R² is hydrogen or an alkyl radical having from 1 to 20 carbon atoms;

(ii) from 0.1 to 10% by weight of at least one second monomer which is a (meth)acrylate monomer and comprises an ortho-alkylphenyl ketone-functional group and/or an ortho-alkylphenylaldehyde-functional group which is isomerizable to a hydroxy-ortho-quinodimethane-functional group by irradiation by means of UV light; and (iii) optionally up to 10% by weight of at least one further, olefinically unsaturated monomer having functional groups, wherein the ortho-alkylphenyl ketone-functional group and/or the ortho-alkylphenylaldehyde-functional group of the at least one second monomer has the following structure:

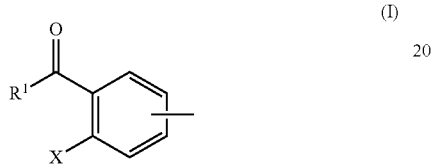

(I)

wherein R¹ is hydrogen or phenyl and X represents a C—H-acidic substituent
wherein the data in % by weight are in each case based on 100% by weight of monomers (i), (ii) and (iii) in the composition.

2. The monomer composition as claimed in claim 1, wherein the second monomer has the following structure (II):

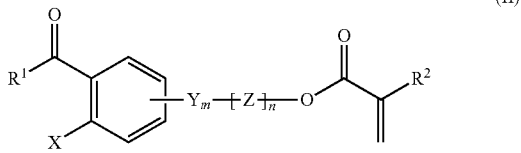

(II)

wherein R¹ is hydrogen or phenyl; X represents a C—H-acidic substituent; R² is hydrogen or methyl; Y is a C, O, S or NH; Z is an ethylene glycol or propylene glycol group or represents an aromatic or aliphatic $C_1$-$C_{18}$-unit; m is 0 or 1; and n is a number from 0 to 10.

3. The monomer composition as claimed in claim 1, wherein the second monomer has the following structure (IIa):

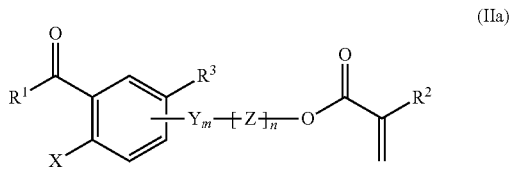

(IIa)

wherein R¹ is hydrogen or phenyl; X represents a C—H-acidic substituent; R² is hydrogen or methyl; Y is a C, O, S or NH; Z is an ethylene glycol or propylene glycol group or represents an aromatic or aliphatic $C_1$-$C_{18}$-unit; m is 0 or 1; n is a number from 0 to 10; and R³ is hydrogen or alkyl.

4. The monomer composition as claimed in claim 1, wherein the first monomer of group (i) is selected from the group consisting of acrylic acid, methacrylic acid, methyl acrylate, methyl methacrylate, ethyl acrylate, ethyl methacrylate, propyl acrylate, propyl methacrylate, n-butyl acrylate, n-butyl methacrylate, n-pentyl acrylate, n-hexyl acrylate, n-hexyl methacrylate, n-heptyl acrylate, n-octyl acrylate, n-nonyl acrylate, lauryl acrylate, stearyl acrylate, stearyl methacrylate, behenyl acrylate, their structural isomers and mixtures thereof;

and/or wherein the second monomer of group (ii) is selected from the group consisting of (meth)acrylic acid esters comprising a 2-formyl-3-methylphenoxy group or a 4-benzoyl-2,5-dimethylphenoxy group;

and/or wherein the third monomer of group (iii) is selected from the group consisting of maleic anhydride, itaconic anhydride, glycidyl methacrylate, hydroxyethyl acrylate, 4-hydroxybutyl acrylate, benzyl acrylate, benzyl methacrylate, phenyl acrylate, phenyl methacrylate, tert-butylphenyl acrylate, tert-butylphenyl methacrylate, phenoxyethyl acrylate, phenoxyethyl methacrylate, 2-butoxyethyl methacrylate, 2-butoxyethyl acrylate, dimethylaminoethyl methacrylate, dimethylaminoethyl acrylate, diethylaminoethyl methacrylate, diethylaminoethyl acrylate and tetrahydrofurfuryl acrylate, and further aromatic vinyl compounds.

5. A process for the preparation of a first polymer composition, which process comprises
a) providing a monomer composition as claimed in claim 1; and
b) radically polymerizing the monomer composition.

6. A polymer composition obtainable by the process as claimed in claim 5.

7. A composition comprising
from 50 to 99.9% by weight of the polymer composition as claimed in claim 6 and
from 0.1 to 15% by weight of a dienophile that is able to react with hydroxy-ortho-quinodimethane-functional groups in a Diels-Alder or hetero-Diels-Alder reaction, wherein the data in % by weight are based on 100% by weight of the first polymer composition and of the dienophile in the composition.

8. The composition as claimed in claim 7, wherein the dienophile contains at least one functional group selected from the group consisting of maleimides, acrylic acid esters and dithioesters.

9. A process for the preparation of a crosslinked polymer composition, which process comprises irradiating the composition of claim 6 with UV light to form a crosslinked polymer composition.

10. The process as claimed in claim 9, which process comprises a step of hot-melt extrusion of the composition prior to irradiation with UV light, wherein the composition is optionally mixed with further additives and/or resins and/or polymers and/or fillers during the hot-melt extrusion step.

11. A crosslinked polymer composition obtainable by the process of claim 9.

12. The polymer composition as claimed in claim 11, wherein the polymer composition is a pressure-sensitive adhesive.

13. A pressure-sensitive adhesive comprising a crosslinked polymer composition of claim 11.

14. A method for the production of a pressure-sensitive adhesive wherein said pressure-sensitive adhesive is produced with a monomer composition of claim 1.

* * * * *